June 7, 1966 J. B. HERON, JR., ETAL 3,255,396

FEED-THROUGH CAPACITOR

Filed Jan. 2, 1964

JOHN B. HERON JR.
JOHN H. FABRICIUS
PETER TSATSA
*INVENTORS*

*BY* Connolly and Hutz

THEIR ATTORNEYS

United States Patent Office 3,255,396

Patented June 7, 1966

3,255,396

FEED-THROUGH CAPACITOR

John B. Heron, Jr., Nashua, N.H., John H. Fabricius, Stamford, Vt., and Peter Tsatsa, Nashua, N.H., assignors to Sprague Electric Company, North Adams, Mass., a corporation of Massachusetts Filed Jan. 2, 1964, Ser. No. 335,025
3 Claims. (Cl. 317—258)

The present invention relates to a ceramic feed-through capacitor.

The principal object of the invention is to present a ceramic capacitor having low inherent inductance with high capacitance per unit volume.

Another object is to present a capacitor having excellent filtering characteristics.

Figure 1:
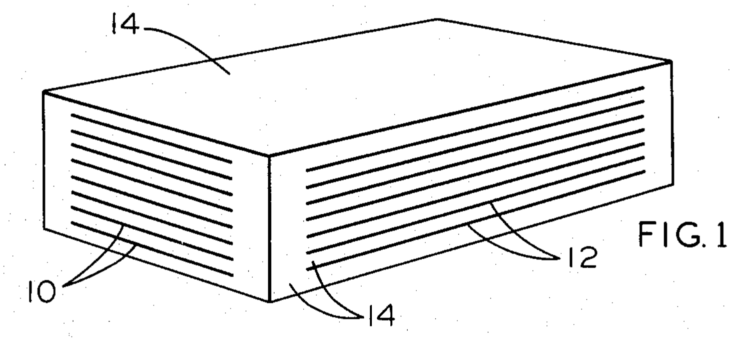
FIGURE 1 is a perspective view of a monolithic ceramic capacitor section.
Figures 2, 3:
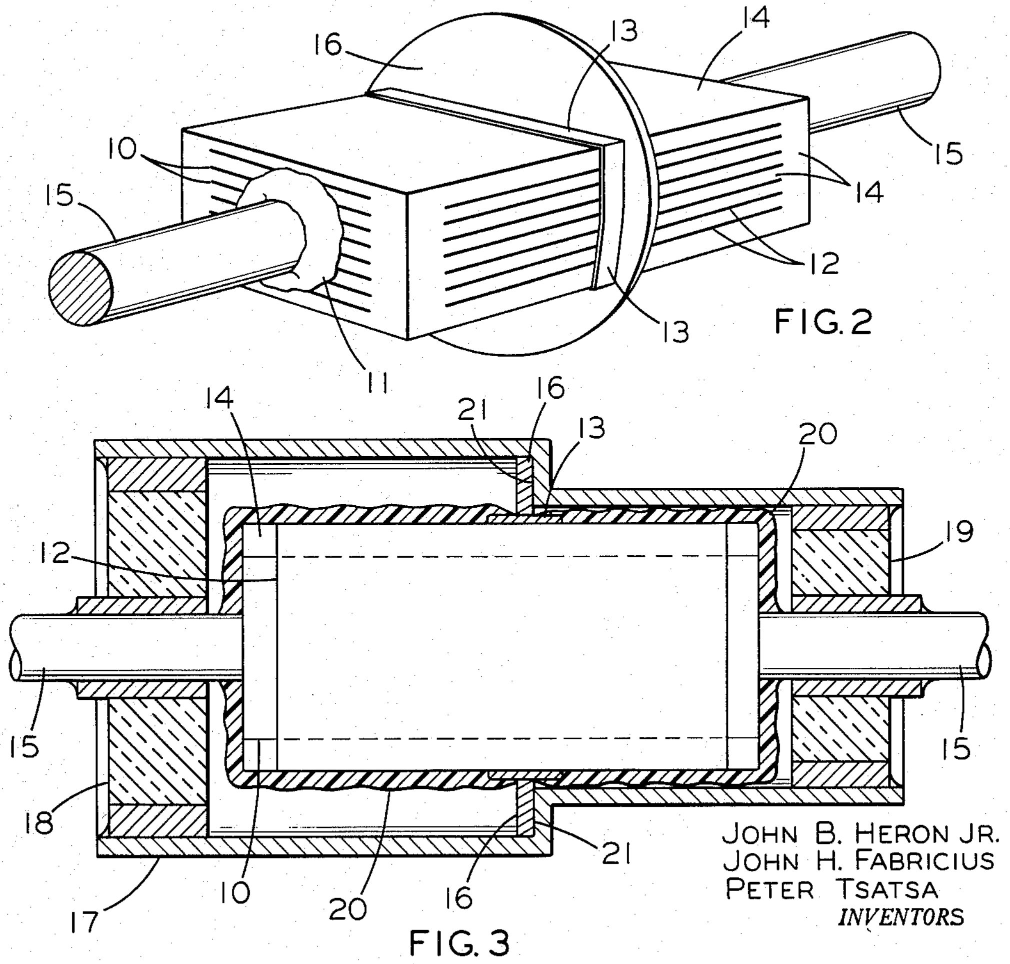
FIGURE 2 is a perspective view of the section of FIGURE 1 having feed-through leads and a metal shield attached.
FIGURE 3 is a side-view, in section, of the encased capacitor of FIGURE 2.

Referring to FIGURES 1 and 2, a plurality of conducting or feed-through electrodes 10, e.g. palladium, are all in electrical communication with one another via electrode pick-up 11, which is of some suitable material e.g. silver solder. A plurality of shield electrodes 12, e.g. palladium, are all in electrical communication with one another by means of an encircling metal band 13, e.g. a silver solder band. All electrodes are spaced from one another by ceramic dielectric material 14, e.g. a barium titanate. The shield electrodes 12 are preferably in interleaved relation to said conducting electrodes 10, as shown. Feed-through leads 15 are affixed to opposite ends of conducting electrodes 10.

It is by means of the encircling metal band that the principal object of the invention is achieved, i.e. low inherent inductance is achieved because of the presence of the encircling metal band. A noninductive insertion of the capacitor into a desired infinite plane is then possible by making ohmic contact between all of the periphery of the metal band and the infinite plane receiving the unit.

A metal collar or shield member 16 conforms with and is affixed to the entire perimeter of said encircling metal band 13. This member facilitates mounting and making ohmic contact between the shield electrodes and the desired infinite plane.

FIGURE 3 shows the unit of FIGURE 2 mounted within metal case 17 which is hermetically sealed, for example with glass-to-metal seals 18 and 19. These seals also serve to insulate feed-through leads 15 from said case. Insulation 20, e.g. a phenolic resin, is applied to the capacitor section to prevent shorting of the conducting electrodes 10 to the metal case 17. Metal collar or shield member 16 is non-inductively communicated with the metal case at shoulder 21. This may be accomplished, for example, by providing a continuous solder bond between all of the periphery of the collar and the shoulder. Shield member 16 may be eliminated to facilitate mounting the capacitor in certain container or circuit designs. In FIGURE 3, in order to show the relative positions of one representative conducting electrode 10 and one representative shield electrode 12 the insulating ceramic layer therebetween has been eliminated.

What is claimed is:

1. A feed-through capacitor comprising a plurality of conducting electrodes all in electrical communication with one another; a plurality of shield electrodes, all in electrical communication with one another by means of an encircling metal band, said shield electrodes being in interleaved relation to said conducting electrodes; all electrodes being spaced from one another by a ceramic dielectric material; and feed-through leads affixed to opposite ends of said conducting electrodes.

2. The feed-through capacitor of claim 1 hermetically sealed within a metal container, said feed-through leads and said conducting electrodes being insulated from said container and said encircling metal band being in physical contact with said container.

3. The feed-through capacitor of claim 1 having a metal shield member conforming with and affixed to the entire perimeter of said encircling metal band.

References Cited by the Examiner

UNITED STATES PATENTS

| | | | |
|---|---|---|---|
| 2,756,375 | 7/1956 | Peck | 317—261 X |
| 3,137,808 | 6/1964 | Coda | 317—242 |

BERNARD A. GILHEANY, *Primary Examiner.*

JOHN F. BURNS, *Examiner.*

E. A. GOLDBERG, *Assistant Examiner.*